United States Patent [19]

Ito et al.

[11] 4,304,577

[45] Dec. 8, 1981

[54] WATER PRODUCING APPARATUS

[75] Inventors: Toshio Ito; Hiromasa Matsuoka; Kenkoku Azuma; Yoshio Hirayama; Nobuyoshi Takahashi, all of Amagasaki, Japan

[73] Assignee: Mitsubishi Denki Kabushiki Kaisha, Tokyo, Japan

[21] Appl. No.: 119,641

[22] Filed: Feb. 7, 1980

[30] Foreign Application Priority Data

Feb. 15, 1979 [JP] Japan .................. 54-17618
Feb. 15, 1979 [JP] Japan .................. 54-17634
Feb. 16, 1979 [JP] Japan .................. 54-17704
Feb. 16, 1979 [JP] Japan .................. 54-17705

[51] Int. Cl.³ ............................................. B01D 53/04
[52] U.S. Cl. ........................................ 55/179; 55/208; 55/387
[58] Field of Search .............. 55/31, 33, 179, 208, 55/387, 389

[56] References Cited

U.S. PATENT DOCUMENTS

| 2,138,689 | 11/1938 | Altenkirch | 55/33 X |
| 2,328,521 | 8/1943 | Wittmann | 55/33 X |
| 2,359,660 | 10/1944 | Martin et al. | 55/33 |
| 2,462,952 | 3/1949 | Dunkak | 55/208 |
| 2,761,292 | 9/1956 | Coanda et al. | 55/208 X |
| 3,104,953 | 9/1963 | Arend et al. | 55/33 X |
| 3,400,515 | 9/1968 | Ackerman | 55/33 X |
| 3,800,507 | 4/1974 | Howell et al. | 55/33 |
| 4,146,372 | 3/1979 | Groth et al. | 55/33 |
| 4,219,341 | 8/1980 | Hussmann | 55/208 X |

FOREIGN PATENT DOCUMENTS 53-104573 11/1978 Japan .................. 55/33

*Primary Examiner*—Robert H. Spitzer
*Attorney, Agent, or Firm*—Oblon, Fisher, Spivak, McClelland & Maier

[57] ABSTRACT

A water producing apparatus is, as a principle, to produce liquid water from moisture in the air by adsorbing the moisture on an adsorbent and then desorbing water from the adsorbent by heating it and condensing steam into liquid water. The water producing apparatus comprises a recycling passage for recycling steam through an adsorbent column in the desorbing step, a heater for heating the steam in the recycling passage; and a condenser branched from the recycling passage. In the desorbing step, steam in the recycling passage is heated by the heater to heat the adsorbent and to desorb water from the adsorbent and excess of steam corresponding to the desorbed steam is passed from the recycling passage to the branched condenser and is condensed to obtain liquid water in high efficiency.

7 Claims, 9 Drawing Figures

WATER PRODUCING APPARATUS

BACKGROUND OF THE INVENTION

1. Field of the Invention

The present invention relates to a water producing apparatus for producing liquid water from moisture in air.

2. Description of the Prior Arts

A water producing apparatus for producing a desalted water from sea water has been well-known as an apparatus for converting sea water into a desalted water. A water treating apparatus for treating a waste water such as a drainage in high degree to obtain water having high clarity has been proposed. This is one of the water producing apparatus classified in the apparatus for converting sea water into a desalted water. These apparatuses require a solution containing liquid water as a main component for producing water. Thus, these water producing apparatus could not be used to produce water in a place where no liquid water is found such as desert since the liquid water is used as the source.

SUMMARY OF THE INVENTION

The present invention is to overcome these disadvantages and to provide a water producing apparatus for producing water even in a place where no liquid water is found.

The water producing apparatus of the present invention is an apparatus for producing water from a moisture in the air and is a novel water producing apparatus which can produce water in any place as far as the air is present. Of course, it is impossible to produce water if no moisture is present in the air. According to the statistical data for weather and the results of inventors' studies, even in the air in a large desert at the central part of Arabia, 3 to 4 g. of water is included in 1 $m^3$ of the air, and accordingly, water can be produced. Thus, water can be obtained in a sterile land to live and to work and water can be used for irrigation to culture plants. The present invention contributes to expand living zones for human-beings and is quite important.

The principle of the present invention is to produce water by adsorbing moisture in the air on an adsorbent as the first step and then, desorbing water adsorbed as steam by heating the water-adsorbed adsorbent and condensing the steam in a condenser as the second step. The adsorbent is dehydrated to recover the adsorbing function whereby the adsorbent can be repeatedly used for adsorbing moisture in air. Thus, liquid water can be repeatedly obtained from air.

The present invention is based on the principle and is to improve the step of heating of the adsorbent and the step of condensing steam obtained by the desorption from the adsorbent in the second step.

The water producing apparatus of the present invention comprises a recycling passage for recycling a gas through a column holding an adsorbent in a desorbing step; a heater for heating said adsorbent in said recycling passage to desorb water adsorbed on said adsorbent; a condenser which is branched from said recycling passage and condenser at least part of steam fed into said recycling passage; and a water tank for receiving liquid water formed in said condenser and said recycling passage being connected through said condenser to the atmosphere.

In the specification, the column means to form a chamber in which an adsorbent is held.

In accordance with the water producing apparatus of the present invention which has said structure, air in the recycling passage is discharged through the condenser branched from the recycling passage to the atmosphere by steam desorbed from the adsorbent into the recycling passage in the initial period of the desorbing step as the second step; whereby the gas remained in the recycling passage is gradually substituted by steam, only. Then, only steam recycles the recycling passage. The recycling passage is connected through the condenser whereby the pressure in the recycling passage is always substantially equal to the atmospheric pressure. The heater heats the steam recycled and fed to the column in the super-heat condition. The super-heated steam heats the adsorbent whereby water adsorbed on the adsorbent in the first step is desorbed as the steam in the recycling passage. The desorbed steam performs so as to increase the total pressure in the recycling passage, however the recycling passage is connected through the condenser to the atmosphere. In the normal state, only part of steam corresponding to the desorbed steam is fed to the condenser. The temperature of the condenser is set to be lower than the temperature for the saturated steam pressure at the atmospheric pressure, whereby all of steam fed in the condenser can be condensed. The temperature of the condenser can be enough low to about 80° C.

In accordance with the water producing apparatus of the present invention, liquid water can be obtained in high efficiency.

BRIEF DESCRIPTION OF THE DRAWINGS

FIG. 3 is a diagram of the embodiment wherein a heater and a recycling passage is placed in a column for holding an adsorbent;

FIG. 4 is a diagram of the embodiment wherein a heat of condensation is used for a part of energy for a heater;

FIG. 5 is a diagram of the embodiment wherein a blower for feeding a gas such as air to the adsorbent column is actuated by a prime mover and the wasted heat is used as a part of energy for a heater;

FIG. 6 is a diagram of the embodiment wherein Rankine cycle engine is driven by the wasted heat from the condenser and a blower for feeding a gas such as air to the adsorbent column is actuated;

FIG. 7 is a diagram of the embodiment wherein an ejector is used as the condenser so as to form a compact apparatus;

FIG. 8 is a diagram of the embodiment wherein an ejector pump is equipped between the condenser and the water tank so as to prevent leakage of steam; and FIG. 9 is a partially enlarged sectional view of the adsorbent column placing the adsorbent in an improved manner.

DETAILED DESCRIPTION OF THE PREFERRED EMBODIMENTS

Figure 1:
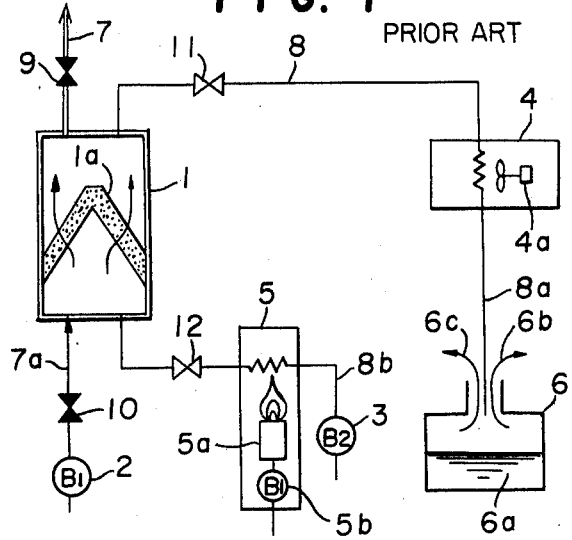
FIG. 1 is a diagram for showing the principle of the apparatus for producing liquid water from moisture in the air.

Before the description of the present invention, the feature shown in FIG. 1 which is considered the principle will be illustrated.

FIG. 1 is a diagram of showing the principle of the apparatus for producing liquid water from moisture in the air by using an adsorbent.

In FIG. 1, the reference numeral (1) designates a column for holding an adsorbent (1a); (2) and (3) respectively designate blowers; (4) designates a condenser for condensing a hot air having high humidity desorbed from the column (1) in the desorbing step; (4a) designates an air cooling fan; (5) designates a heater for heating the air fed through the blower (3), by a burner (5a); (5b) designates a blower for the heater which is placed in the heater (5); (6) designates an air-open type water tank which stores water obtained by the condensation; (6a) designates water produced; (7) designates a discharge passage for discharging a dried air fed from the column (1) after adsorbing moisture in the adsorbing step as the first step; (7a) designates a sucking passage for feeding the air into the column (1); (8) designates a passage for feeding the hot air having high humidity fed from the column (1) in the second step; (8a) designates a passage for discharging water obtained by the condenser (4) and also discharging air (8b) designates a passage for feeding air past the heater (5) to the column (1); and (9), (10), (11) and (12) respectively valves for opening and closing the passages which are placed in the passages for feeding the air, the dried air and the hot air having high humidity.

The operation of the present invention will be illustrated.

As the adsorbing step (the first step) for adsorbing moisture in the air on the adsorbent (1a) held in the column (1), the valve (9) and the valve (10) are opened and the blower (2) is driven to feed the air into the column (1). The moisture in the air is adsorbed on the adsorbent (1a) and the dried air is discharged from the column (1) through the valve (9). When the adsorbent (1a) adsorbs enough moisture, the adsorbing step is finished. Then, the desorbing step for desorbing water adsorbed on the adsorbent (1a) is carried out. The valves (9) and (10) are closed and then the valves (11) and (12) are opened. Thus, the air is fed into the heater (5) by the blower (3) and the hot air heated by the burner (5a) (about 300° C. in the case of silica gel as the adsorbent) is fed into the column (1) whereby the adsorbent (1a) is heated to desorbd the adsorbed water as the steam. The temperature of the hot air fed from the heater (5) is decreased by the latent heat for desorption. When silica gel is used as the adsorbent (1a), it is preferable to be about 200° C. as the temperature of the hot air having high humidity discharged from the column (1). The temperature is depending upon the desorbing velocity of the adsorbent and the desorption ratio of water adsorbed. The hot air having high humidity (about 200° C.) discharged from the column (1) is fed through the valve (11) and the passage (8) to the condenser (4) wherein it is cooled by the cooling fan (4a) to be condensed to produce liquid water.

Thus, the steam which is condensed into liquid water by the condenser (4) is only excess of steam over the saturated steam pressure at the temperature of the condenser (4). When the steam is less than the saturated steam pressure, no condensation is resulted and the steam is passed through the condenser and is discharged with air through the water tank (6) to the atmosphere to the direction of the arrow lines (6b), (6c).

As described below, the system of FIG. 1 can not be used in the practical operation since it is difficult to increase the steam pressure over the saturated steam pressure in the condensation and it is not advantageous in view of heat economy.

The present invention is to provide a water producing apparatus which is practically used without discharging steam desorbed from the adsorbent, and with less consumption of heat energy.

The structures and the functions and results of the water producing apparatus will be described in detail.

Figure 2:
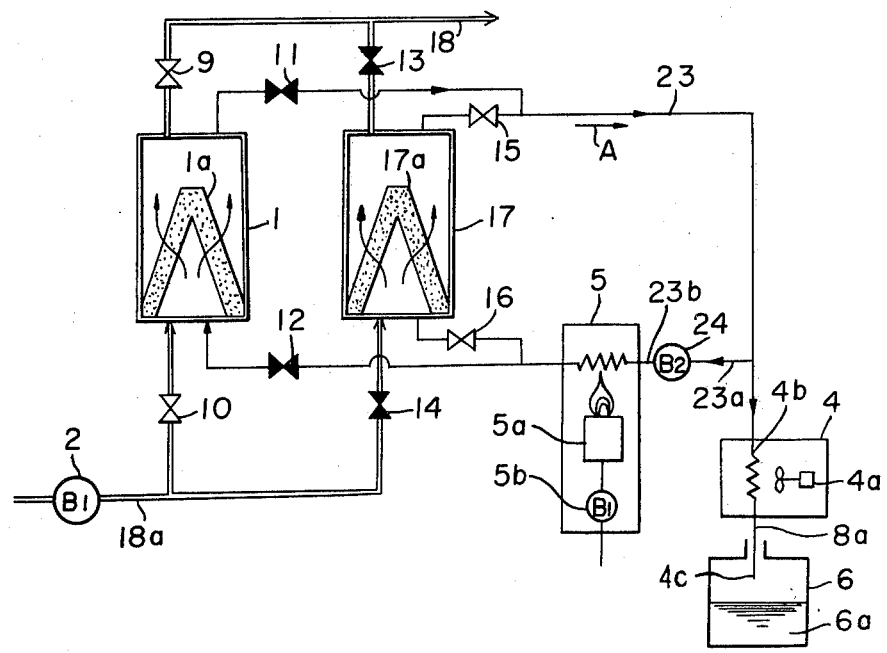
FIG. 2 is a diagram of one embodiment of the water producing apparatus of the present invention.

FIG. 2 is a diagram of one embodiment of the present invention.

In FIG. 2, the reference numeral (17) designates a column which has the same structure of the column (1) and an adsorbent (17a) is filled in the column; (13) and (14) respectively designate valves for opening or closing the passage and said valves are substantially the same as the valves (9), (10) in the column (1); (18a) designates a passage for feeding a gas from a blower (2) to the column (1) or (17); (18) designates passage for feeding the gas discharged from the column (1) or (17); (15) and (16) respectively designate valves for opening and closing the passage for feeding a gas for desorption to the column (17) and said valves are substantially the same as the valves (11) and (12) in the column (1). The references (23), (23a) and (23b) respectively designate recycling passages for desorption of water from the adsorbents (1a) or (17a); (24) designates a blower for recycling the gas for desorption in the recycling passage (23) to the direction of the arrow line A; (4b) designates a pipe line for feeding a gas containing desorbed steam, which is branched from the recycling passage (23); and (4c) designates a part for opening the pipe line (4b) to the atmosphere. The other reference numerals designate the same as those of FIG. 1.

The operation will be illustrated.

The operation of an adsorbing step in the first column (1) and a desorbing step in the second column (17) will be considered.

In the adsorbing step, the valves (9), (10) are opened; and the valves (13), (14) are closed and air is fed from the blower (2) into the column (1) so as to adsorb moisture in the air, on the adsorbent (1a). In this step, the valves (11), (12) are closed.

On the other hand, in the desorbing step, the valves (15), (16) are opened and the blower (24) is driven to pass the gas (such as the air containing moisture) in the recycling passage (23) to the direction of the arrow line A and to feed the gas heated by the heater (5) as high temperature (about 300° C. in the case of silica gel adsorbent) into the column (17) so as to start the desorbing operation. The adsorbent (17a) is heated by the hot gas whereby the adsorbed water is desorbed as steam. The gas containing steam obtained by the desorption is passed through the valve (15) to the recycling passage (23). The gas in the recycling passage (23) has volumetric expansion resulted by steam desorbed from the adsorbent. Therefore, a part of the gas is fed through the branched pipe line (4b) into the condenser (4) whereas most of the gas is recycled by passing through the passage (23a) to the blower (24) and feeding through the heater (5) to the column (17) by the blower (24).

The feature of the present invention is to recycle the hot gas for desorption. That is, the temperature of the gas discharged from the column (17) in the desorbing step into the recycling passage (23) is about 200° C. when the temperature at the inlet of the column is 300° C. because of the latent heat for desorption as described referring to FIG. 1. In the embodiment of the present invention, the gas is recycled to the column (17) and accordingly, it is enough to heat the gas at 200° C. to 300° C. (for 100° C.) in the heater.

In the system shown in FIG. 1, it is necessary to heat the gas from the ambient temperature (25° C.) to 300° C. (for 275° C.).

As it is understood, in accordance with the embodiment of the present invention, the heat energy for desorption can be reduced to 40%

$$\left(\frac{100(°C.)}{275(°C.)} = 0.36\right)$$

in comparison with the system shown in FIG. 1. The detail will be described below.

The recovery of water will be illustrated.

The gas fed into the branched pipe line (4b) by the volumetric expansion of desorbed steam, is steam containing air at the initial period in the desorbing step. Therefore, steam is not completely condensed in the condenser (4) whereby a part of steam is discharged with air to the atmosphere to cause a loss. Thus, air remained in the initial period is gradually substituted by the desorbed steam in the desorbing step, whereby the recycling gas is converted into only steam. Therefore, after the complete substitution, 100% of the desorbed steam is condensed into water when the temperature of the condenser (4) is lower than 100° C. The period for discharging steam with air in the initial period through the outlet opening (4c) is negligible in comparison with the total desorbing period. Therefore, moisture in the air is substantially condensed into water. This is the advantage of the present invention over the system shown in FIG. 1.

The embodiment of the present invention using molecular sieve as an adsorbent will be illustrated.

The use of the molecular sieve as the adsorbed is not critical. Any other adsorbent which adsorbs moisture in a gas phase and desorbs the adsorbed water by heating, can be also used.

Typical example of a two column type water producing apparatus having a water producing coefficient of 100 kg. water/day (two columns are used) which repeates three times of desorptions per day for each column will be illustrated.

The adsorbing period and the desorbing period are respectively four hours and an amount of water adsorbed during one adsorbing period is given as follows.

$$\frac{1000}{2} \times \frac{1}{3} = 167 \text{ kg.}$$

When an effective adsorption by the molecular sieve is 8%, the amount of the molecular sieve should be as follows.

$$167 \times \frac{100}{8} = 2100 \text{ kg.}$$

The volume of the column for filling the molecular sieve is about 4 m³, and the volume of the air is about 1 m³.

On the other hand, the amount of steam generated by the desorption is give as follows.

$$167 \times 1.6 = 267 \text{ m}^3$$

wherein a specific volume of steam (m³/kg at 100° C.) is 1.6. The specific volume per/hour is 267/4–67 m²/hour. Therefore, an amount of moisture discharged with 1 m³ of air is remarkably smaller than the total steam and accordingly it is negligible. Thus, air is discharged for only short time and then, only steam is recycled. In particular, it is enough to use only three times of steam to the volume of air in order to substitute 90% of air and it takes only 3 minutes as $$\frac{1 \times 3}{67} = 0.045 \text{(hour)}.$$

Thus, in accordance with this system, the gas for supplying heat to the adsorbent is steam. The flow velocity of the recycled steam (V:m³/hour) required for supplying heat is given as follows.

$$\frac{167 \times 900}{4} = 150 \times 0.16 \times V$$

$$V = 1600 \text{ (m}^3\text{/hour)}$$

wherein a latent heat of the molecular sieve for desorption is 900 k.cal/kg.water and a difference of temperatures at the inlet and the outlet of the column is 150° C.; and a specific heat of steam at 300° C. is 0.16 k.cal/m³ steam.

In the case of the molecular sieve, the temperature of the hot gas fed into the column is preferably controlled to give the temperature of the adsorbent of 350° to 450° C. Therefore, the temperature at the inlet of the column is preferably 500° to 600° C. The temperature is depending upon a content of water remained on the adsorbent in the desorption.

In the case of 350° to 450° C. of the temperature of the adsorbent, about 3 to 4 wt.% of water is remained on the adsorbent. In the absorbing step, ten and several % of water is adsorbed, whereby the effective adsorption of water can be higher than 8 wt.%.

Now, air in the column (17) had been discharged for about 3 minutes, and then, only steam is recycled. The pressure in the gas recycling passage (23) is always about 1 atm. since the passage is opened through the condenser (4) to the atmosphere.

The recycling gas is only steam except the initial period in the desorbing step. The steam corresponding to the desorbed steam is fed to the condenser (4) to form water. There is no other gas beside steam, whereby no gas is discharged from the outlet of the condenser (4) and 100% of steam is condensed into water.

The temperature in the condenser (4) can be the temperature for condensation of steam in the atmospheric pressure, i.e. lower than about 100° C. For example, it can be 90° C.

In this embodiment, air is not included in the recycling gas, as different from the system shown in FIG. 1. Therefore, it is unnecessary to cool air whereby the condenser (4) can be small and the blowing air for cooling can be minimized.

It is unnecessary to cool the recycling gas, since the recycling gas is only steam and the amount of steam corresponding to the steam increased by the desorption is fed as 100% steam to the condenser.

There is a question whether the desorption of water from the adsorbent can be performed with steam in the water producing apparatus of the present invention. There is no problem on this feature. The function for the desorption is the temperature and it is balanced to the partial pressure of steam around the adsorbent. The partial pressure of steam is about 1 atm. (atmospheric pressure) and it is not higher than 1 atm. Therefore, it is enough to elevate the temperature of the adsorbent over the temperature corresponding to 1 atm. When it is at 350° to 450° C. as described above, the desorption can be performed to give only 3 to 4 wt.% of the residual water content even though the pressure of steam is 1 atm. On the other hand, any kind of hot gas can be used for supplying heat to the adsorbent. Thus, the steam can be used for supplying heat.

The steam in the recycling passage is heated by the heater (5) at the inlet of the column (17) to be 500° to 600° C. Even though heat is supplied to the adsorbent to decrease the temperature, the temperature of the steam at the outlet of the column (17) is 350° to 450° C. On the other hand, the pressure of the steam is 1 atm. to be always the super-heat condition. It is the dried steam whereby it is not condensed to form water even though heat is supplied from the steam to the recycling passage and the adsorbent. The steam is condensed to form water only when excess of the steam is fed to the condenser (4) for cooling it to lower than 100° C.

The flow rate of the air (m²/sec.) fed into the column (1) of the water producing apparatus having a capacity of 1000 kg.water/day in the adsorbing step is given as follows.

$$\frac{1000 \times 10^3}{(10-3)} \times \frac{1}{24} \times \frac{1}{60} \times \frac{1}{60} = 1.7 \text{ m}^2/\text{sec.}$$

wherein a water content in the air is 10 g.water/m³.air and water is adsorbed to be 3 g.water/m³.air by the adsorbent. This is not so much.

The efficiencies of the apparatuses shown in FIG. 1 (the reference) and FIG. 2 (the invention) are further compared.

In the apparatus shown in FIG. 1, silica gel is used as the adsorbent and 2000 kg. of silica gel is filled in the column.

In order to compare with the apparatus shown in FIG. 1, only one column is used in the apparatus shown in FIG. 2 and 2000 kg. of silica gel is filled in the column.

The air containing 10 g. of moisture per 1 m³ (10 g.water/m³.air) (more than 20 g. of moisture is usually contained in 1 m³ of the air in summer) is fed into each column. The moisture in the air is adsorbed on the adsorbent to discharge a dried air containing about 3 g. of moisture per 1 m³ (3 g.water/m³.air). The effective water adsorption percent of silica gel in said humidity at about 25° C. is about 16 wt.%. Therefore, a blow gas velocity V of the air fed into the column is given as follows in the adsorbing step for 4 hours.

$$\frac{2000 \times 0.16}{(10-3) \times 10^{-3}} = 4 \times V$$

$$V = 12,000 \text{ m}^3/\text{hour} = 200 \text{ m}^3/\text{min.} = 3.3 \text{ m}^3/\text{sec.}$$

The data are common for the features shown in FIG. 1 and FIG. 2.

The desorbing steps of the features shown in FIG. 1 and FIG. 2 are compared.

The latent heat for desorption of water adsorbed on the silica gel is 700 k.cal./kg.water. The heat required for the desorption per hour (heat supplied to silica gel) Q is given as follows in the desorbing step for 4 hours.

$$2000 \times 0.16 \times 700 = 4 \times Q$$

$$Q = 56,000 \text{ k.cal/hour.}$$

This is common in both features.

The blow gas velocity for the desorption V in the desorbing step feeding the hot gas at 300° C. and discharging the gas at 200° C. is given as follows.

$$56,000 = (300-200) \times 0.2 \times V$$

$$V = 2,800 \text{ m}^3/\text{hour} = 47 \text{ m}^3/\text{min.} = 0.8 \text{ m}^3/\text{sec.}$$

wherein the specific heat of the gas is 0.2 k. cal./m³gas.

The blow gas velocity is common in both features.

The heat $q_1$ (FIG. 1) and the heat $q_2$ (FIG. 2) which should be supplied from the heater (5) will be considered. (The ambient temperature is 25° C.).

The heat in the feature of FIG. 1.

$$q_1 = 2,800 \times (300-25) \times 0.2 = 154,000 \text{ k.cal/hour.}$$

The heat in the feature of FIG. 2. The temperature of the gas fed into the heater (5) is about 200° C.

$$q_2 = 2,800 \times (300-200) \times 0.2 = 56,000 \text{ k.cal/hour.}$$

The heat required in the feature of FIG. 2 is about 40% to that of FIG. 1.

$$\left(\frac{56,000}{154,000} = 0.4\right)$$

In the practical operation, the heat for heating the silica gel to 200° to 300° C. and the heat loss from the surface of the adsorbent column are considered. Therefore, $q_1$ and $q_2$ are slightly higher than the theoretical values (about 20%). It is understood that the feature of FIG. 2 of the present invention requires remarkably smaller heat.

The recovered water will be illustrated.

The saturated steam pressure at the temperature of the condenser (4) of 45° C. is about 64 g. water/m³.air as the absolute humidity.

In the feature of FIG. 1, the absolute humidity of the gas containing steam desorbed from the adsorbent in the column in the desorbing step (the air and steam at 200° C.) can be calculated by dividing the desorbed water rate per hour by the gas velocity V and adding the moisture in the air fed (10 g.water/m³.air).

$$\frac{2,000 \times 0.16 \times 10^3}{4} \times \frac{1}{2,800} + 10 = 39 \text{ g.water/m}^3 \cdot \text{air}$$

This value is less than 64 g.water/m³ and accordingly, the condensation of steam is not resulted by the condenser in this condition. That is, no water is produced.

In order to produce water, the temperature of the condenser is decreased. In the practical operation, it is difficult to decrease to In this feature, even though the size of the condenser is increased to be infinitive and the coolant gas velocity given by the cooling fan (4a) is increased to be infinitive and the temperature is decreased to 25° C. as the ambient temperature, the saturated steam pressure is 23 g.water/m$^3$.air as the absolute humidity. Thus, only 40% of water $$\left(\frac{39-23}{39} \doteq 0.4\right)$$

can be recovered.

When the gas velocity V of the gas fed into the column in the desorbing step is lower, the absolute humidity of the gas discharged from the column is increased as considered from the above-mentioned equation. Thus, the recovery of water can be performed even though the temperature of the condenser is higher. In such feature, the temperature of the gas is increased in the reversely proportional to the gas velocity V. The efficiency of the heater is lowered and silica gel is deteriorated at higher than 450° C. Therefore, the feature of FIG. 1 is remarkably difficult in the practical operation.

On the other hand, in accordance with the feature of FIG. 2 (the invention), about 100% of water can be recovered as described above.

At the final moment in the desorbing step, steam as the recycling gas remained in the column is discharged to the atmosphere by the switching to the absorbing step. Thus, the amount of steam is only about 0.8 kg: (0.4 kg./cm$^3$ of specific gravity of steam at 250° C. and 1 atm.)×2 m$^3$. This is negligible to 320 kg. (2,000×0.16) of water recovered.

As described, the water producing apparatus of the present invention has excellent advantages for heat economy and water recovery.

Figure 3:
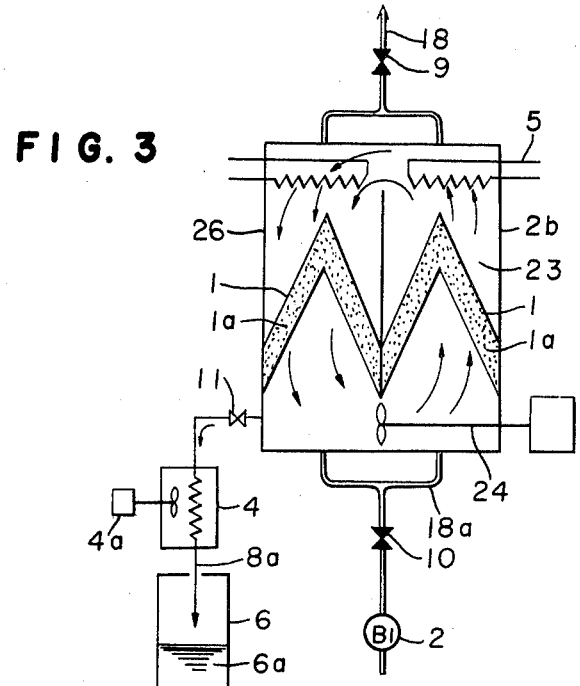
FIGS. 3 to 9 are respectively diagrams of the other embodiments of the water producing apparatus of the present invention.

FIG. 3 is a diagram of the other embodiment of the present invention wherein the column (1), the heater (5) the recycling passage (23) and the blower (24) are kept in a casing (26).

FIG. 3 shows the desorbing step and the arrow line in the casing (26) indicates the gas flow in the recycling passage (23).

The embodiment has the advantage of a simpler structure of the recycling passage. For example, three columns are used to carry out the adsorbing step, the desorbing step and the cooling step for cooling the adsorbent heated by the desorption in a desired sequence so as to continuously produce water. It is also easy to control the apparatus by an automatic control means. Various modification can be considered. For example, in the embodiment of FIG. 2 or 3, the heater (5) is placed to contact with the adsorbent (1a) or (17a) so as to decrease the space for the apparatus. It is also preferable to utilize the solar energy as the heat source or the power source or to equip various heat system for effective utilization of energy.

Certain other embodiments of the present invention will be further illustrated.

Figure 4:
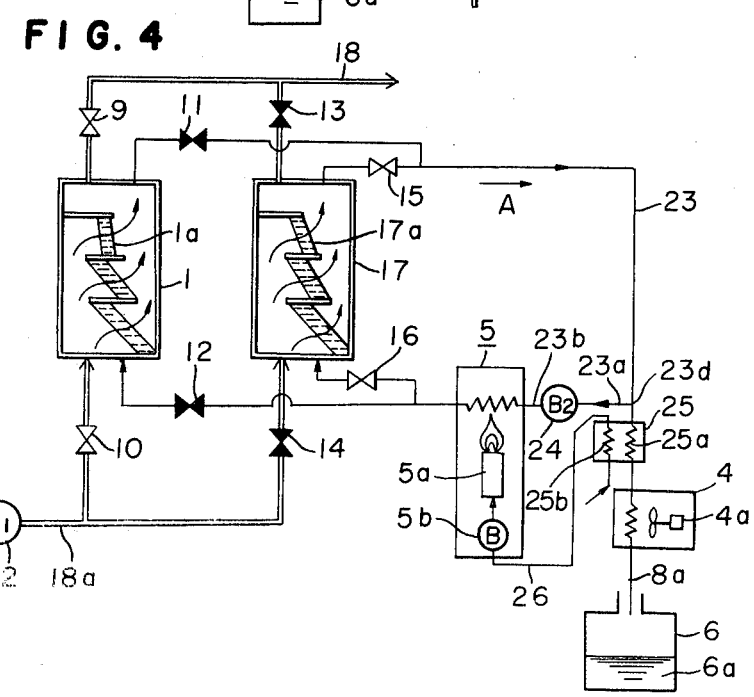

FIG. 4 shows a modification of the embodiment of FIG. 2 wherein a heat recovering device (25) is connected between the branched point (23d) in the recycling passage and the condenser (4) and heat recovered by the heat recovering passage (25) is fed to the heater (5) so as to effectively utilize the heat.

In this embodiment, a primary pipe line (25a) of the heat exchanger (25) is connected so as to form a part of the pipe line connecting the branched point (23d) and the condenser (4). A secondary pipe line (25b) which is thermally coupled to the primary pipe line (25a) at one end is opened to the atmosphere. The other end of the secondary pipe line (25b) is connected through the pipe line (26) to the blower (5b) for the heater (5).

The operation of this embodiment for producing water is substantially the same with that of FIG. 2. Thus, the air for combustion fed to the burner (5a) by the blower (5b) is preheated by the heat-exchanger (25) whereby a part of heat energy required for the heater (4) can be supplied by the heat recovering device (25) and a loss of heat can be minimized.

The heat recovering device (25) can be formed as one body with the condenser. That is, the secondary pipe line (25b) is placed in the condenser (4) to thermally couple them so as to receive the heat of condensation of steam discharged from the recycling passage (23).

Figure 5:
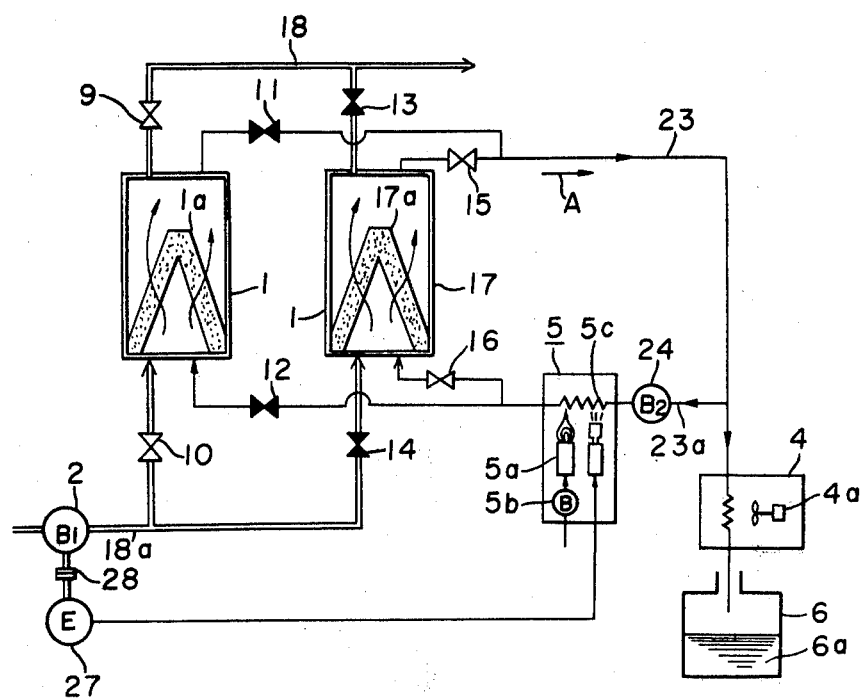

FIG. 5 shows the other modification of the embodiment wherein the blower (2) for feeding air to the adsorbent columns (1) and (17) is driven by a prime mover (27) and wasted heat of the prime mover (27) is fed to the heater (5) so as to effectively utilize energy.

In FIG. 5, the blower (2) is driven by the prime mover (such as an internal combustion engine such as gasoline engine and Diesel engine) connected through a coupling (28). The coil (5c) of the heater (5) is thermally coupled to the engine (27) so as to receive the wasted heat of the engine (27). The other features is the same as those of FIG. 2.

In the water producing apparatus having said structure, the valves (9), (10), (15) and (16) are opened and the valves (11), (12), (13) and (14) are closed and the blower (2) is driven by the engine (27) whereby the adsorbing operation is carried out in the adsorbent column (1) as the same as that of FIG. 2. On the other hand, the adsorbent (17a) treated by the adsorbing operation is placed in the recycling passage (23) and the desorbing operation is carried out by driving the blower (24) and the heater (5). In this operation, the wasted heat of the engine (27) is used as a part of heat energy required for the heater (5). From the economical and energy saving viewpoint, this feature is advantageous.

When a gasoline engine or Diesel engine is used as the prime mover (27), the burner (5a) and the blower (5b) can be eliminated.

Figure 6:
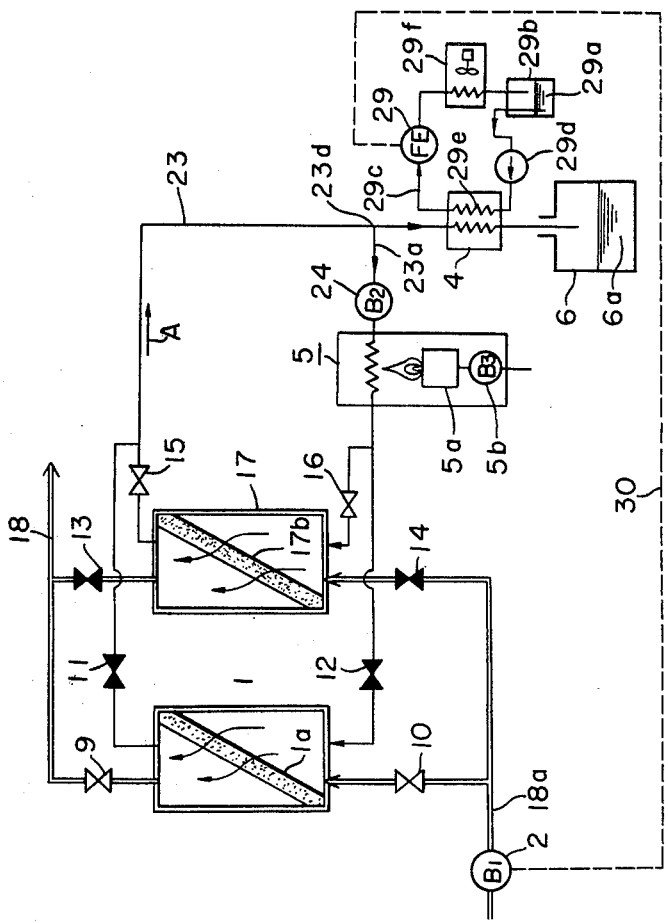

FIG. 6 shows a modification wherein the condenser (4) and the Rankine cycle engine (29) are combined to drive the Rankine cycle engine (29) by the heat generated in the condenser (4) and the blower (2) is driven by the resulting power so as to effectively utilize the energy.

In FIG. 6, the reference numeral (29) designates a Freon using engine etc. which comprises Freon (29a), a tank (29b) for Freon; a passage for Freon (29c), a feed pump (29d); a Freon evaporator (29c) and Freon condensing part (29f) placed in the condenser (4).

The condenser (4) has the function as a heat-exchanger for transferring the heat of distillation to the Freon evaporator (29e); the reference numeral (30) designates a power transmitting mechanism for transmitting the driving power of the Freon engine (29) to the blower (2).

The other mechanism is the same as that of the embodiment of FIG. 2.

The principle operation for producing the liquid water in this embodiment is substantially the same as that of FIG. 2. Therefore, the description is not recited.

Only the operation of Rankine cycle engine will be illustrated.

In the desorbing step, the super-heated steam (350°–450° C.) containing steam desorbed from the adsorbent (17b) in the column (17) is passed from the recycling passage (23) to the condenser (4) having a function of a heat-exchanger so as to balance the pressure to the atmospheric pressure. The super-heated steam is heat-exchanged at about 90° C. Therefore, Freon (such as Freon R-114) fed to the condenser (4) by the feed pump (29) is converted into a Freon gas at about 90° C. and about 11 atm. and the Freon gas is fed from the condenser (4) to rotate the Freon engine (29). After driving the Freon engine (29), the Freon gas is cooled to about 38° C. and about 2.2 atm. and is further cooled by the condenser (29f) to form the liquid Freon and to store it in the tank (29b). The liquid Freon (29a) in the tank (29b) is fed again by the feed pump (29d) to the vaporizing part (29e) of the condenser (4). The rotary power of the Freon engine (29) is applied through the power transmitting mechanism (30) to drive the blower (2) whereby the air is fed to the column (1) or (17).

In accordance with this embodiment of the water producing apparatus of the present invention, the loss of energy is minimized to obtain the liquid water in the liquid phase in high efficiency from the moisture in the air. This is remarkably effective.

When water is not adsorbed on any adsorbents (1a) and (17b) held in the columns (1) and (17), the Freon engine (29) is not actuated even though the heater (5) and the blower (4) are driven. Therefore, the adsorbing step is not started.

In order to prevent such trouble, another device for heating the evaporator (29e) is equipped or another device as a blower-driving source is equipped as an auxiliary device.

The typical condenser (4) used in the embodiments 2, 3, 4 and 5 comprises a tube made of a high heat conductive metal such as copper and aluminum which has many fins on the outer surface and in which steam is passed and said fins are cooled by a coolant such as air.

In the embodiment of FIG. 6, the heat-exchange is carried out through a partition having high heat conductivity. This is not critical.

Figure 7:
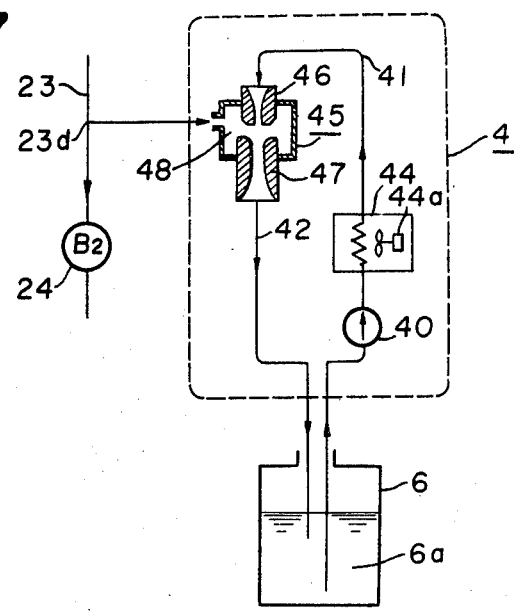

FIG. 7 shows a modification wherein an ejector type condenser is used. In FIG. 7, the part (4) surrounding by the broken line corresponds to the condenser (4) shown in FIG. 2.

The desorbed steam discharged from the column is passed through the branched point (23d) into the condenser (4) and is condensed to form the liquid water and this is stored in the tank (6).

The operation and the characteristic of the condensation will be illustrated.

The reference numeral (45) designates an ejector type condenser; (40) designates a pump for recycling water to the ejector type condenser (45); (44) designates a device for cooling water which is recycled; (44a) designates a fan for air cooling; (41) designates a pipe line from the pump (40) to the ejector condenser (45); (42) designates a pipe line from the ejector type condenser (45) to the water tank (6). The liquid water formed by condensing in the ejector type condenser (45) is combined with the recycling water to feed into the water tank (6). The increased liquid water is stored in the water tank as the increased water.

As it is well-known, the ejector type condenser (45) comprises a nozzle (46), a throat part (47) and a reduced pressure chamber (48). The water ejected from the nozzle (46) sucks steam (gas) in the reduced pressure chamber (48) so as to perform the complete gas-liquid contact. The steam is condensed into the liquid water. The temperature of water in the pipe line (42) is raised by latent heat for condensation.

In this embodiment, the temperature of water is kept in constant by cooling water by the cooler (44).

In accordance with the ejector type condenser, steam is directly brought into contact with water for receiving latent heat for condensation and steam is mixed as fine bubbles with water in the throat (47). The contact area between steam and water is remarkably large.

In usually, the ejector condenser (45) can be remarkably small in comparison with the condenser (4) shown in FIG. 2, and the efficiency for contact is remarkably high. The temperature of the recycling water for receiving latent heat for condensation can be only slightly lower than the temperature for the saturated steam pressure (in this case, about 100° C. since the steam pressure is substantially the atmospheric pressure).

In the case of the condenser shown in FIG. 2, it is preferably cooled to about 60° C. On the other hand, in the case of the ejector type condenser, the recycling water can be at about 95° C. The heat received for the condensation of steam is equal for the same steam. Thus, the heat removed by the condenser (4) shown in FIG. 2 is substantially the same as that of the cooler (44) in this embodiment. In the former embodiment, it is removed from the lower temperature (60° C.) whereas in this embodiment, it can be removed from the higher temperature (95° C.). Therefore, the cooler (44) of this embodiment can be smaller than the condenser (4) of the embodiment of FIG. 2. The condenser (4) of this embodiment can be compact.

This embodiment using the ejector type condenser has also the following advantages beside the advantage of the smaller size condenser.

In the embodiment of FIG. 2, the desorbed steam is passed from the recycling passage (23) into the condenser to form the liquid water. When steam passes the condenser (4), a pressure loss is caused whereby the pressure in the columns (1) and (17) are slightly higher than the atmospheric pressure (several tens to several hundred mmH₂O). On the other hand, the desorbing step is carried out at the high temperature. It is not easy to maintain a complete sealing and to prevent a leakage of steam.

On the other hand, in accordance with the ejector type condenser, water is ejected from the nozzle to forcibly suck steam whereby the pressure in the column is substantially the same as the atmospheric pressure or lower. The leakage of steam from the column can be prevented.

The cooler (44) can be placed in the pipe line (42) after the ejector type condenser (45). In said case, the pressure loss of the cooler (44) is applied to the ejector type condenser (45) whereby the limit of the reduced pressure in the reduced pressure chamber (48) is increased for the pressure corresponding to the pressure loss. There is, however no trouble because the pressure in the reduced pressure chamber can be the atmospheric pressure or slightly lower.

It is possible to eliminate the cooler (44) by equipping fins on the ejector type condenser (45) and cooling the fins of the ejector type condenser by feeding air.

Figure 8:
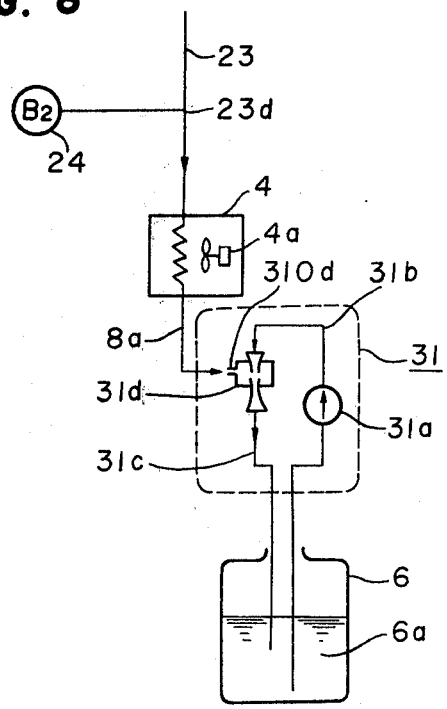

FIG. 8 shows a modification of the embodiment of FIG. 2 wherein an ejector is equipped in the pipe line connecting the condenser (4) and the water tank (6) so as to prevent a leakage of steam.

In FIG. 8, the reference numeral (31) designates a device for preventing a leakage of steam which comprises a pump (31a) for recycling water (6a) in the water tank (6); and an ejector (31d) equipped in the recycling passages (31b), (31c). The sucking part (310d) of the ejector (31d) is connected through the pipe line (8a) to the condenser (4). The other structure of the embodiment is the same as that of FIG. 2.

As described above, a pressure loss is caused in the condenser (4) in the desorbing step. The pressure loss in the adsorbent columns (1), (17) may reach to several hundreds $mmH_2O$.

The ejector (31d) is used for maintaining the pressure in the adsorbent column to slightly lower than the atmospheric pressure by reducing the pressure for the pressure loss at the outlet of the condenser (4) whereby the leakage of steam is prevented. In accordance with the device for preventing the leakage of steam (31), the condensation of steam is prevented whereby it is unnecessary to equip a cooler for water passing through the recycling passages (31b), (31c).

Figure 9:
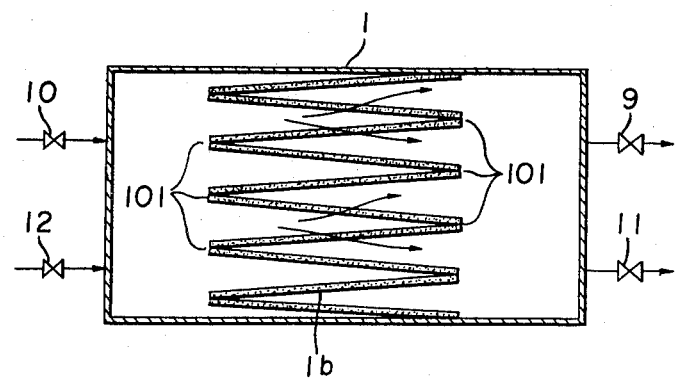

FIG. 9 shows a modification wherein the arrangement of the adsorbent (1b) in the columns (1), (17) is improved.

In FIG. 9, the adsorbent (1b) is arranged in a zig-zag form; and (101) designates a turned point in the zig-zag form. The other structure is the same as those of the embodiments of FIGS. 1 to 8.

In accordance with the water producing apparatus having said structure, a plurality of platelike adsorbent layers (1b) are arranged in zig-zag form in the column (1). The total surface area of the adsorbent layers (1b) is large and accordingly, the amount of the adsorbent can be increased without increasing the thickness of the adsorbent layer (1b) and the total adsorbable water can be increased. Since the thickness of the adsorbent layer (1b) is not thick, a flow resistance is not high and a flow rate of air is not lowered. Moreover, an adsorption percent of the adsorbent on the front surface is not different from that of the rear surface.

In this embodiment, the adsorbent layer (1b) is arranged to the direction near the horizontal direction. Therefore, there is no trouble for forming a space of non-adsorbent layer (1b) in the adsorbent column even though a vibration is applied. When the adsorbent layer is arranged to the direction near the vertical direction, the adsorbent layer is fallen down by a vibration to form a space of non-adsorbent at the upper part of the adsorbent column. When such space is formed, air passes through the space having non-adsorbent and having lower flow resistance whereby moisture in the air is not satisfactorily adsorbed on the adsorbent layers and the efficiency for producing water is lowered. Thus, if there is no possibility to fall down the adsorbent layers, the surfaces of the adsorbent layers can be arranged near the vertical direction.

Various embodiments of the present invention have been described, however, obviously, numerous modifications and variations of the present invention are possible in light of the above teachings. It is therefore to be understood that within the scope of the appended claims, the invention may be practiced.

The water producing apparatus of the present invention can effectively produce liquid water from moisture in the air in practice.

We claim:

1. A water producing apparatus comprising: at least one adsorbing column containing a moisture adsorbing material;
   means for introducing a moisture bearing gas into each of said at least one adsorbing columns;
   a condenser;
   discharge passage means between each of said at least one column and said condenser;
   a water tank for holding water condensed in said condenser;
   a recycling passage connected between each of said at least one adsorbing column and a portion of said discharge passage located between said at least one adsorbing column and said condenser; and
   a heater adapted for heating the gas in said recycling passage.

2. A water producing apparatus according to claim 1 wherein said adsorbent column, said heater and said recycling passage are arranged in one casing.

3. A water producing apparatus according to claim 1 wherein heat of condensation generated in said condenser is recovered and supply it as a part of heat energy for said heater.

4. A water producing apparatus according to claim 1, including a blower for feeding a gas containing moisture into said adsorbent column, said blower being driven by a prime mover and the wasted heat of said prime mover is supplied as at least a part of the heat energy required for said heater.

5. A water producing apparatus according to claim 1 including a Rankine cycle engine using wasted heat of said condenser, said engine providing power for feeding said gas containing moisture to said adsorbent column.

6. The apparatus of claim 1 including valve means in said means for introducing, said discharge passage means and said recycling passage, whereby each said at least one column can be selectively connected to said means for introducing, or said discharge passage and said recycling passage.

7. The apparatus of claim 1 wherein said water tank

* * * * *

UNITED STATES PATENT AND TRADEMARK OFFICE
CERTIFICATE OF CORRECTION

PATENT NO. : 4,304,577
DATED : DECEMBER 8, 1981
INVENTOR(S) : WOLFGANG BURANK

It is certified that error appears in the above-identified patent and that said Letters Patent is hereby corrected as shown below:

Column 14, line 57, after "tank", insert --is at atmospheric pressure--.

Signed and Sealed this

Sixteenth Day of July 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,304,577

DATED : December 8, 1981

INVENTOR(S) : TOSHIO ITO, ET AL

It is certified that error appears in the above-identified patent and that said Letters Patent is hereby corrected as shown below:

Column 14, line 57, after "tank", insert --is at atmospheric pressure --.

This certificate supersedes Certificate of Correction issued July 16, 1985.

Signed and Sealed this

Twelfth Day of November 1985

[SEAL]

Attest:

Attesting Officer

DONALD J. QUIGG

Commissioner of Patents and Trademarks